US012694841B2

(12) United States Patent
Xing

(10) Patent No.: US 12,694,841 B2
(45) Date of Patent: Jul. 28, 2026

(54) DISPLAY DEVICE HAVING DISPLAY AREA WITH ADJUSTABLE BRIGHTNESS, AND DRIVING METHOD THEREOF, DRIVING DEVICE FOR DRIVING THE SAME, AND DISPLAY APPARATUS INCLUDING THE SAME

(71) Applicants: Beijing BOE Display Technology Co., Ltd., Beijing (CN); BOE TECHNOLOGY GROUP CO., LTD., Beijing (CN)

(72) Inventor: Ying Xing, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 892 days.

(21) Appl. No.: 17/778,908

(22) PCT Filed: Jun. 3, 2021

(86) PCT No.: PCT/CN2021/098114

§ 371 (c)(1),
(2) Date: Dec. 8, 2022

(87) PCT Pub. No.: WO2022/252179

PCT Pub. Date: Dec. 8, 2022

(65) Prior Publication Data

US 2024/0169938 A1 May 23, 2024

(51) Int. Cl.
*G09G 3/34* (2006.01)
*G09G 3/20* (2006.01)
*G09G 3/36* (2006.01)

(52) U.S. Cl.
CPC ......... *G09G 3/3426* (2013.01); *G09G 3/2018* (2013.01); *G09G 3/36* (2013.01);
(Continued)

(58) Field of Classification Search
CPC .................................................... G09G 3/3426
See application file for complete search history.

(56) References Cited

U.S. PATENT DOCUMENTS

2009/0243982 A1* 10/2009 Lee ...................... G09G 3/3406 345/88
2011/0122171 A1* 5/2011 Kwon .................... G09G 3/342 345/102

(Continued)

FOREIGN PATENT DOCUMENTS

CN 1567417 A 1/2005
CN 101329846 A 12/2008

(Continued)

OTHER PUBLICATIONS

China Patent Office, First Office Action, Dec. 17, 2025, for corresponding CN application No. 202180001424.8.

*Primary Examiner* — William Boddie
*Assistant Examiner* — Andrew B Schnirel
(74) *Attorney, Agent, or Firm* — HOUTTEMAN LAW LLC

(57) ABSTRACT

The present disclosure provides a display device, including a display panel and a backlight source sequentially stacked. The backlight source is on a light incidence side of the display panel; the display device is divided into at least one display area, the display panel is divided into at least one display unit, the backlight source is divided into at least one backlight unit; the display area at least includes one display unit and one backlight unit; each backlight unit at least corresponds to one display unit; the backlight unit is configured to provide a light source for the display unit; and in the display area, at least one of a grayscale voltage of the display unit and a luminance of the backlight unit is adjust-
(Continued)

able. The present disclosure further provides a driving method of a display device, a driving device and a display apparatus.

10 Claims, 6 Drawing Sheets

(52) U.S. Cl.
CPC ............... *G09G 2320/0233* (2013.01); *G09G 2320/0242* (2013.01)

(56) References Cited

U.S. PATENT DOCUMENTS

| | | | | |
|---|---|---|---|---|
| 2011/0128302 | A1* | 6/2011 | Cho | G09G 3/3406 345/690 |
| 2012/0287147 | A1 | 11/2012 | Brown Elliott et al. | |
| 2013/0314459 | A1* | 11/2013 | Nakanishi | G09G 3/3406 345/694 |
| 2018/0218690 | A1* | 8/2018 | Zhou | G09G 3/3406 |
| 2022/0293061 | A1* | 9/2022 | Yabuki | G09G 3/3614 |
| 2022/0335879 | A1* | 10/2022 | Chen | G09G 3/2081 |

FOREIGN PATENT DOCUMENTS

| | | | |
|---|---|---|---|
| CN | 101388183 | A | 3/2009 |
| CN | 102298908 | A | 12/2011 |
| CN | 104143322 | A | 11/2014 |
| CN | 105632413 | A | 6/2016 |
| CN | 107863086 | A | 3/2018 |
| CN | 108062937 | A | 5/2018 |
| JP | H10206826 | A | 8/1998 |
| JP | 2008058443 | A | 3/2008 |

* cited by examiner determine the grayscale voltage corresponding to the second target grayscale corresponding to the to-be-displayed grayscale in the first mapping relationship as the to-be-displayed grayscale voltage

S2122

FIG. 7 determine a to-be-displayed PWM duty ratio according to the to-be-displayed grayscale and the to-be-displayed grayscale voltage, so as to adjust the luminance of the backlight unit corresponding to the to-be-displayed image area

S221

FIG. 8 perform fitting according to the corresponding relationship between the grayscale, the grayscale voltage, and a PWM duty ratio to determine the to-be-displayed PWM duty ratio

S2211

FIG. 9

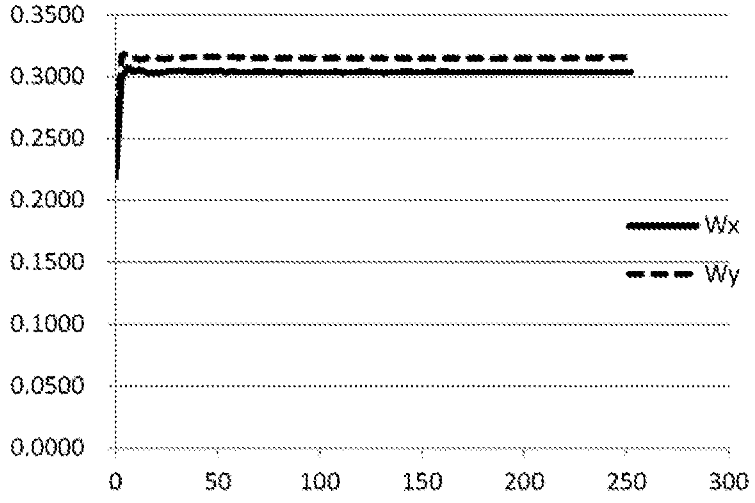

FIG. 10

DISPLAY DEVICE HAVING DISPLAY AREA WITH ADJUSTABLE BRIGHTNESS, AND DRIVING METHOD THEREOF, DRIVING DEVICE FOR DRIVING THE SAME, AND DISPLAY APPARATUS INCLUDING THE SAME

CROSS-REFERENCE TO RELATED APPLICATION

This is a National Phase Application filed under 35 U.S.C. 371 as a national stage of PCT/CN2021/098114, filed on Jun. 3, 2021.

TECHNICAL FIELD

The present disclosure relates to the field of display technologies, and in particular, to a display device, a driving method of a display device, a driving device, and a display apparatus.

BACKGROUND

The color gamut of a traditional liquid crystal display (LCD) in a low brightness range is smaller, and the color gamut of the LCD is gradually increased as the grayscale increases; when the grayscale increases to a certain value, the color gamut reaches the maximum and remains stable. In addition, in the low brightness range, as the grayscale increases, the color coordinates of red, green and blue of the LCD have different change trends, which causes problems of color distortion, loss of dark details, jump of color temperature, etc. in the low brightness range of the LCD, and seriously affects the color rendition capability of the LCD.

In some related arts, color gamut uniformity of a display panel, in particular an LCD display panel, over the whole brightness range has not been achieved.

SUMMARY

Embodiments of the present disclosure provide a display device, a driving method of a display device, a driving device and a display apparatus.

In a first aspect, an embodiment of the present disclosure provides a display device, including a display panel and a backlight source sequentially stacked, wherein the backlight source is on a light incidence side of the display panel; the display device is divided into at least one display area, the display panel is divided into at least one display unit, the backlight source is divided into at least one backlight unit; the display area at least includes one of the at least one display unit and one of the at least one backlight unit; each backlight unit at least corresponds to one display unit; the backlight unit is configured to provide a light source for the display unit; and in the display area, at least one of a grayscale voltage of the display unit and a luminance of the backlight unit is adjustable.

In some embodiments, in the display area, the grayscale voltage of the display unit has a preset voltage value; and at least one of the grayscale voltage of the display unit and the luminance of the backlight unit being adjustable includes the luminance of the backlight unit being adjustable according to a to-be-displayed luminance of the display area and the preset voltage value.

In some embodiments, in the display area, the luminance of the backlight unit is a preset luminance; and at least one of the grayscale voltage of the display unit and the luminance of the backlight unit being adjustable includes: the grayscale voltage of the display unit being adjustable according to a grayscale corresponding to a to-be-displayed luminance of the display area and the preset luminance.

In some embodiments, in the display area, at least one of the grayscale voltage of the display unit and the luminance of the backlight unit being adjustable includes: the grayscale voltage of the display unit being adjustable according to a to-be-displayed luminance of the display area; and the luminance of the backlight unit being adjustable according to the to-be-displayed luminance of the display area and the grayscale voltage of the display unit.

In a second aspect, an embodiment of the present disclosure provides a driving method of a display device, wherein the display device includes a display panel and a backlight source sequentially stacked, the backlight source is on a light incidence side of the display panel; the display device is divided into at least one display area, the display panel is divided into at least one display unit, the backlight source is divided into at least one backlight unit; the display area at least includes one of the at least one display unit and one of the at least one backlight unit; each backlight unit at least corresponds to one display unit and configured to provide a light source for the display unit; and in the display area, the driving method includes: determining a to-be-displayed grayscale of a to-be-displayed image area corresponding to the display area, wherein a to-be-displayed image is divided into at least one to-be-displayed image area, and each to-be-displayed image area corresponds to one display area; and determining at least one of a to-be-displayed grayscale voltage of the display unit and a luminance of the backlight unit according to the to-be-displayed grayscale.

In some embodiments, in the display area, the to-be-displayed grayscale voltage has a preset voltage value; and determining at least one of the to-be-displayed grayscale voltage of the display unit and the luminance of the backlight unit according to the to-be-displayed grayscale includes: determining the luminance of the backlight unit according to the to-be-displayed grayscale and the preset voltage value such that the display area displays a luminance corresponding to the to-be-displayed grayscale.

In some embodiments, in the display area, the luminance of the backlight unit is a preset luminance; and determining at least one of the to-be-displayed grayscale voltage of the display unit and the luminance of the backlight unit according to the to-be-displayed grayscale includes: determining the to-be-displayed grayscale voltage according to the to-be-displayed grayscale and the preset luminance such that the display area displays a luminance corresponding to the to-be-displayed grayscale.

In some embodiments, determining at least one of the to-be-displayed grayscale voltage of the display unit and the luminance of the backlight unit according to the to-be-displayed grayscale includes: determining the to-be-displayed grayscale voltage according to the to-be-displayed grayscale; and determining the luminance of the backlight unit according to the to-be-displayed grayscale and the to-be-displayed grayscale voltage such that the display area displays a luminance corresponding to the to-be-displayed grayscale.

In some embodiments, determining the to-be-displayed grayscale voltage according to the to-be-displayed grayscale includes: determining whether the to-be-displayed grayscale is lower than a low grayscale threshold; and determining the to-be-displayed grayscale voltage according to a grayscale mapping relationship between a plurality of low grayscales and at least one high grayscale in response to the to-be-displayed grayscale being lower than the low grayscale threshold, wherein a grayscale lower than the low grayscale threshold is the low grayscale, and a grayscale not lower than the low grayscale threshold is the high grayscale.

In some embodiments, the grayscale mapping relationship indicates the plurality of low grayscales each corresponding to a first target grayscale, the first target grayscale being the high grayscale; and determining the to-be-displayed grayscale voltage according to the grayscale mapping relationship between the plurality of low grayscales and the at least one high grayscale includes: determining a grayscale voltage corresponding to the first target grayscale in a first mapping relationship as the to-be-displayed grayscale voltage, wherein the first mapping relationship includes a corresponding relationship between a plurality of grayscales and a plurality of grayscale voltages.

In some embodiments, the grayscale mapping relationship includes one-to-one correspondence between a plurality of low grayscales and a plurality of second target grayscales in a target grayscale section in descending order, and the plurality of second target grayscales are high grayscales; and determining the to-be-displayed grayscale voltage according to the grayscale mapping relationship between the plurality of low grayscales and the at least one high grayscale includes: determining a grayscale voltage corresponding to a second target grayscale corresponding to the to-be-displayed grayscale in a first mapping relationship as the to-be-displayed grayscale voltage, wherein the first mapping relationship includes a corresponding relationship between a plurality of grayscales and a plurality of grayscale voltages.

In some embodiments, determining the to-be-displayed grayscale voltage according to the to-be-displayed grayscale further includes: determining a grayscale voltage corresponding to the to-be-displayed grayscale in a first mapping relationship as the to-be-displayed grayscale voltage, in response to the to-be-displayed grayscale being not lower than the low grayscale threshold, wherein the first mapping relationship includes a corresponding relationship between a plurality of grayscales and a plurality of grayscale voltages.

In some embodiments, adjusting the luminance of the backlight unit according to the to-be-displayed grayscale and the to-be-displayed grayscale voltage includes: determining a duty ratio of pulse width modulation of a to-be-displayed grayscale according to the to-be-displayed grayscale and the to-be-displayed grayscale voltage to determine the luminance of the backlight unit.

In some embodiments, determining the duty ratio of pulse width modulation (PWM) of the to-be-displayed grayscale according to the to-be-displayed grayscale and the to-be-displayed grayscale voltage includes: performing fitting according to a corresponding relationship between the grayscale, the grayscale voltage and a duty ratio of pulse width modulation to determine the duty ratio of pulse width modulation of the to-be-displayed grayscale.

In a third aspect, the present disclosure provides a driving device applied to a display device, wherein the display device includes a display panel and a backlight source sequentially stacked, the backlight source is on a light incidence side of the display panel; the display device is divided into at least one display area, the display panel is divided into at least one display unit, the backlight source is divided into at least one backlight unit; the display area at least includes one of the at least one display unit and one of the at least one backlight unit; each backlight unit at least corresponds to one display unit; the backlight unit is configured to provide a light source for the display unit; and the driving device is configured to perform any one of the driving methods as described in the second aspect of the embodiments of the present disclosure to drive the display device.

In a fourth aspect, an embodiment of the present disclosure provides display apparatus, including any one of the display devices as described in the first aspect of the embodiments of the present disclosure and the driving device as described in the third aspect, wherein the driving device is configured to drive the display device to display.

BRIEF DESCRIPTION OF DRAWINGS

The accompanying drawings, which constitute a part of the specification, are used to provide a further understanding of the embodiments of the present disclosure and explain the present disclosure together with the embodiments of the present disclosure, and do not constitute a limitation of the disclosure. The above and other features and advantages will become more apparent to those skilled in the art by describing in detail example embodiments thereof with reference to the accompanying drawings, in which:

FIG. 7 is a flow chart of part of steps in another driving method according to an embodiment of the present disclosure;

FIG. 8 is a flow chart of part of steps in another driving method according to an embodiment of the present disclosure;

FIG. 9 is a flow chart of part of steps in another driving method according to an embodiment of the present disclosure;

FIG. 10 is a schematic diagram illustrating color coordinates of white light varying with grayscales according to an embodiment of the present disclosure;

DETAIL DESCRIPTION OF EMBODIMENTS

In order to enable those skilled in the art to better understand the technical solutions of the present disclosure, a display device, a driving method of a display device, a driving device and a display apparatus according to the present disclosure will be described below in further detail with reference to the accompanying drawings.

Example embodiments will be described more fully hereinafter with reference to the accompanying drawings, but may be embodied in different forms and should not be construed as being limited to the embodiments set forth herein. Rather, these embodiments are provided so that the present disclosure will be thorough and complete, and will fully convey the scope of the present disclosure to those skilled in the art.

Embodiments of the present disclosure and features of the embodiments may be combined with each other without conflict.

As used herein, the term "and/or" includes any and all combinations of one or more of the associated listed items.

The terms used herein are merely for the purpose of describing particular embodiments and are not intended to limit the present disclosure. As used herein, the singular forms "a", "an" and "the" are intended to include the plural forms as well, unless the context clearly indicates otherwise. It will be further understood that the terms "include" and/or "made of", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having meanings that are consistent with their meanings in the context of the related art and the present disclosure, and will not be interpreted in an idealized or overly formal sense unless expressly so defined herein.

Figure 1:
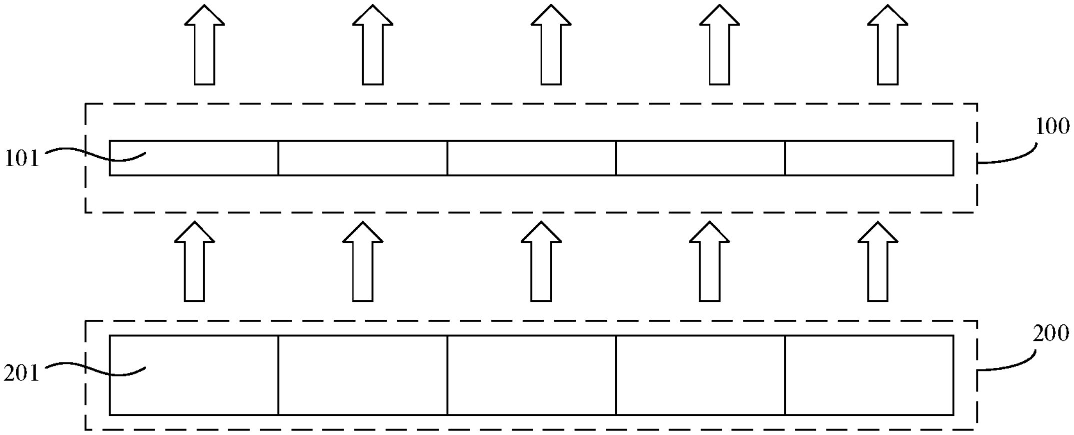
FIG. 1 is a schematic diagram of a display device according to an embodiment of the present disclosure.
Figure 2:
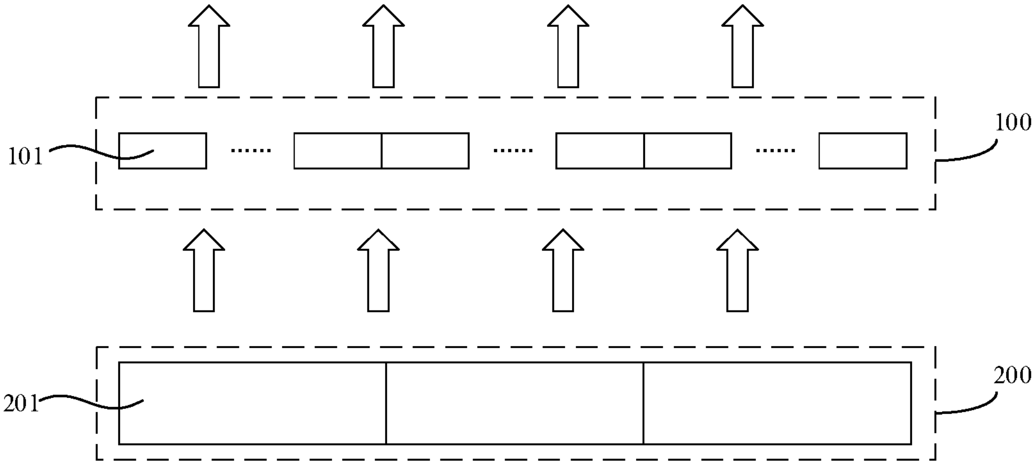
FIG. 2 is a schematic diagram of a display device according to an embodiment of the present disclosure.

In a first aspect, referring to FIG. 1 and FIG. 2, embodiments of the present disclosure provide a display device, the display device includes a display panel 100 and a backlight source 200 that are sequentially stacked, and the backlight source 200 is disposed on a light incident side of the display panel 100. The display device is divided into at least one display area, the display panel 100 is divided into at least one display unit 101, and the backlight source 200 is divided into at least one backlight unit 201. Each display area at least includes one display unit 101 and one backlight unit 201. Each backlight unit 201 corresponds to at least one display unit 101, and is configured to provide a light source for the display unit 101. In the display area, at least one of a grayscale voltage of the display unit 101 and a luminance of the backlight unit 201 is adjustable.

In FIGS. 1 and 2, one backlight unit 201 corresponds to one display area. In FIG. 1, the backlight units 201 are provided in one-to-one correspondence with the display units 101. In FIG. 2, one backlight unit 201 corresponds to a plurality of display units 101. It should be noted that FIG. 1 and FIG. 2 are only exemplary illustrations of the display device according to the embodiments of the present disclosure, and are not intended to limit the display device according to the embodiments of the present disclosure. For example, the display panel 100 may be taken as one entire display unit, and the backlight source 200 may be taken as one entire backlight unit.

In an embodiment of the present disclosure, the display device includes a plurality of pixels, and one display unit 101 may include one pixel or a plurality of pixels. Accordingly, one backlight unit 201 may correspond to one pixel or a plurality of pixels. The embodiments of the present disclosure are not particularly limited thereto.

Note that, in the display devices shown in FIGS. 1 and 2, each backlight unit 201 independently provides a light source for the corresponding display unit 101, and at least one of light transmittance of the display unit 101 and the luminance of the backlight unit 201 in each display area can be independently adjusted, thereby achieving light control on an area basis. When the backlight units 201 are in one-to-one correspondence with the display units 101, and one backlight unit 201 corresponds to one pixel, pixel-level light control on an area basis can be realized, and the embodiments of the present disclosure is not particularly limited thereto.

In an embodiment of the disclosure, the display device may support 8 bits and 256 levels of grayscales, and other grayscales may also be supported, which is not particularly limited in the embodiments of the present disclosure.

The display panel 100 is not particularly limited in the embodiments of the present disclosure. For example, the display panel 100 may be a liquid crystal display panel; or may be a light-emitting diode (LED) display panel or a mini-LED display panel.

The backlight source 200 is not particularly limited in the embodiments of the present disclosure. For example, the backlight source 200 is an array of micro LEDs.

In an embodiment of the present disclosure, the luminance of the display area, the luminance of the backlight unit 201, and the light transmittance of the display unit 101 satisfy formula (1):

$$I_D = I \times \text{Trans} \quad (1)$$

where $I_D$ is the luminance of the display area, I is the luminance of the backlight unit 201, and Trans is the light transmittance of the display unit 101.

In an embodiment of the present disclosure, the light transmittance of the display unit 101 is related to the grayscale voltage of the display unit 101. Also, if the display units 101 have different light transmittances, the color gamut values of the display area are different. For example, when the light transmittance of the display unit 101 is greater than a certain threshold, the color gamut of the display area reaches the maximum and remains stable; when the light transmittance of the display unit 101 is less than the certain threshold, the color gamut of the display area may decrease as the light transmittance of the display unit 101 decreases.

In the embodiment of the present disclosure, at least one of the grayscale voltage of the display unit 101 and the luminance of the backlight unit 201 is adjustable, and the change of the light transmittance of the display unit 101 and/or the change of the luminance of the backlight unit 201 may cause the brightness of the display area to change, so that the display area can display different brightness. In the case that the grayscale voltage of the display unit 101 is adjustable, the color gamut of the display area may be adjusted to display different brightness by adjusting the grayscale voltage of the display unit 101; in the case that the grayscale voltage of the display unit 101 is fixed, the grayscale voltage of the display unit 101 may be set to a voltage value that maximizes and stabilizes the color gamut of the display area, and the luminance of the backlight unit 201 may be adjusted such that the display area displays different brightness with the maximum and stable color gamut. Therefore, the color gamut of the display device can be highly consistent over the whole brightness range, and the color coordinates of R, G and B can be kept stable, the problems of color distortion, loss of dark details, color temperature jump and the like can be avoided, and the display performance of the display device can be effectively improved.

In some embodiments, in the display area, the grayscale voltage of the display unit 101 has a preset voltage value; and at least one of the grayscale voltage of the display unit 101 and the luminance of the backlight unit 201 being adjustable includes: the luminance of the backlight unit 201 being adjustable according to a to-be-displayed luminance of the display area and the preset voltage value.

It is not particularly limited how to adjust the luminance of the backlight unit 201 in the embodiments of the present disclosure. For example, the backlight unit 201 can be configured to have a plurality of luminance values corresponding to different grayscales, and the luminance of the backlight unit 201 is adjusted to the luminance corresponding to the corresponding grayscale according to the preset voltage value and the to-be-displayed luminance of the display area.

In some embodiments, in the display area, the luminance of the backlight unit 200 is a preset luminance; at least one of the grayscale voltage of the display unit 101 and the luminance of the backlight unit 201 being adjustable includes: the grayscale voltage of the display unit 101 being adjustable according to the grayscale corresponding to the to-be-displayed luminance of the display area and the preset luminance.

It is not particularly limited how to adjust the grayscale voltage of the display unit 101 in the embodiments of the present disclosure. For example, the grayscale voltage of the display unit may be set to a plurality of voltage values corresponding to different grayscales, and the grayscale voltage of the display unit 101 is adjusted to the voltage value corresponding to the corresponding grayscale according to the preset luminance and the to-be-displayed luminance of the display area.

In some embodiments, in the display area, at least one of the grayscale voltage of the display unit 101 and the luminance of the backlight unit 201 being adjustable includes the grayscale voltage of the display unit 101 being adjustable according to the to-be-displayed luminance of the display area; and the luminance of the backlight unit 201 being adjustable according to the to-be-displayed luminance of the display area and the grayscale voltage of the display unit 201.

Figure 3:
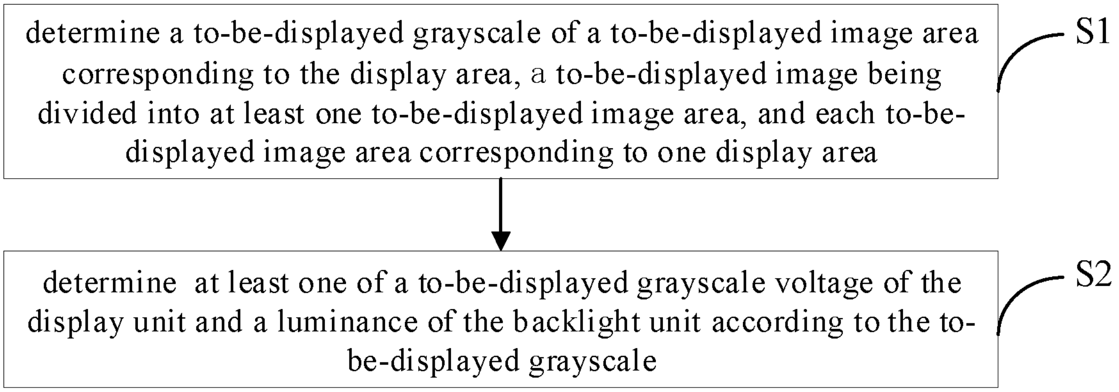
FIG. 3 is a flow chart of a driving method according to an embodiment of the present disclosure.

In a second aspect, referring to FIG. 3, an embodiment of the present disclosure provides a driving method of a display device, the display device includes a display panel and a backlight source that are sequentially stacked, and the backlight source is disposed on a light incident side of the display panel. The display device is divided into at least one display area, the display panel is divided into at least one display unit, and the backlight source is divided into at least one backlight unit. Each display area at least includes one display unit and one backlight unit. Each backlight unit corresponds to at least one display unit and is configured to provide a light source for the display unit. In the display area, the driving method includes Steps S1 and S2.

Step S1 includes determining a to-be-displayed grayscale of a to-be-displayed image area corresponding to the display area, a to-be-displayed image being divided into at least one to-be-displayed image area, and each to-be-displayed image area corresponding to one display area.

Step S2 includes determining at least one of a to-be-displayed grayscale voltage of the display unit and the luminance of the backlight unit according to the to-be-displayed grayscale.

The display device according to the embodiments of the present disclosure is as shown in FIGS. 1 and 2. In FIGS. 1 and 2, the display panel 100 is divided into a plurality of display units 101, the backlight source 200 is divided into a plurality of backlight units 201, and one backlight unit 201 corresponds to one display area. In FIG. 1, the backlight units 201 are provided in one-to-one correspondence with the display units 101. In FIG. 2, one backlight unit 201 corresponds to a plurality of display units 101. It should be noted that FIG. 1 and FIG. 2 are only exemplary illustrations of the display device according to the embodiments of the present disclosure, and are not intended to limit the display device according to the embodiments of the present disclosure. For example, the display panel 100 may be taken as an entire display unit, and the backlight source 200 may be taken as an entire backlight unit.

In an embodiment of the present disclosure, the display device includes a plurality of pixels, and one display unit 101 may include one pixel or a plurality of pixels. Accordingly, one backlight unit 201 may correspond to one pixel or a plurality of pixels. The embodiments of the present disclosure are not particularly limited thereto.

Note that, in the display devices shown in FIGS. 1 and 2, each backlight unit 201 independently provides a light source for the corresponding display unit 101, and at least one of light transmittance of the display unit 101 and the luminance of the backlight unit 201 in each display area can be independently adjusted, thereby achieving light control on an area basis. When the backlight units 201 are in one-to-one correspondence with the display units 101, and one backlight unit 201 corresponds to one pixel, pixel-level light control on an area basis can be realized, and the embodiments of the present disclosure is not particularly limited thereto.

In the embodiment of the present disclosure, the to-be-displayed image area is obtained by dividing the to-be-displayed image in the same manner of dividing the display device into the display area, and the to-be-displayed image areas are in one-to-one correspondence with the display areas. When the display apparatus displays the to-be-displayed image, the to-be-displayed image area is displayed in the corresponding display area.

In an embodiment of the disclosure, the display device may support 8 bits and 256 levels of grayscales, and other grayscales may also be supported, which is not particularly limited in the embodiment of the present disclosure.

In the embodiment of the present disclosure, when the display device is driven, at least one of the grayscale voltage of the display unit 101 and the luminance of the backlight unit 201 can be adjusted. In the case that the grayscale voltage of the display unit 101 is adjustable, the color gamut of the display area may be adjusted to display different luminance by adjusting the grayscale voltage of the display unit 101; in the case that the grayscale voltage of the display unit 101 is fixed, the grayscale voltage of the display unit 101 may be set to a voltage value that maximizes and stabilizes the color gamut of the display area, and the luminance of the backlight unit 201 is adjusted such that the display area displays different luminance with the maximum and stable color gamut. Therefore, the color gamut of the display device can be highly consistent over the whole brightness range, and the color coordinates of R, G and B can be kept stable, the problems of color distortion, loss of dark details, color temperature jump and the like can be avoided, and the display performance of the display device can be effectively improved.

In some embodiments, the to-be-displayed grayscale voltage of the display unit 101 in the display area is a fixed value, the luminance of the backlight unit 201 can be adjusted, and the display area displays different luminance by adjusting the luminance of the backlight unit 201. In some embodiments, the specified grayscale voltage of the display unit 101 has a voltage value that can maximize the color gamut of the display area and maintain the color gamut of the display area stable, thereby ensuring that the color gamut of the display area is maximized and consistent over the whole brightness range.

Accordingly, in some embodiments, in the display area, the to-be-displayed grayscale voltage has a preset voltage value; the step of determining at least one of the to-be-displayed grayscale voltage of the display unit 101 and the luminance of the backlight unit 201 according to the to-be-displayed grayscale includes: determining the luminance of the backlight unit 201 according to the to-be-displayed grayscale and the preset voltage value, such that the display area displays the luminance corresponding to the to-be-displayed grayscale.

In some embodiments, the to-be-displayed grayscale voltage of the display unit 101 in the display area can be adjusted, the luminance of the backlight unit 201 is a fixed value, the light transmittance of the display unit 101 is adjusted by adjusting the to-be-displayed grayscale voltage of the display unit 101, so that the display area displays different luminance, and the color gamut of the display area can be adjusted during adjustment of the to-be-displayed grayscale voltage of the display unit 101. In some embodiments, the to-be-displayed grayscale voltage of the display unit 101 varies within a voltage value range that can maximize and stabilize the color gamut of the display area, thereby ensuring that the color gamut of the display area is maximized and consistent over the whole brightness range.

Accordingly, in some embodiments, in the display area, the luminance of the backlight unit 201 is a preset luminance; the step of determining at least one of the to-be-displayed grayscale voltage of the display unit 101 and the luminance of the backlight unit 201 according to the to-be-displayed grayscale includes: determining the to-be-displayed grayscale voltage according to the to-be-displayed grayscale and the preset luminance, such that the display area displays the luminance corresponding to the to-be-displayed grayscale.

In some embodiments, the grayscale voltage of the display unit 101 and the luminance of the backlight unit 201 in the display area can be adjusted in conjunction.

Figure 4:
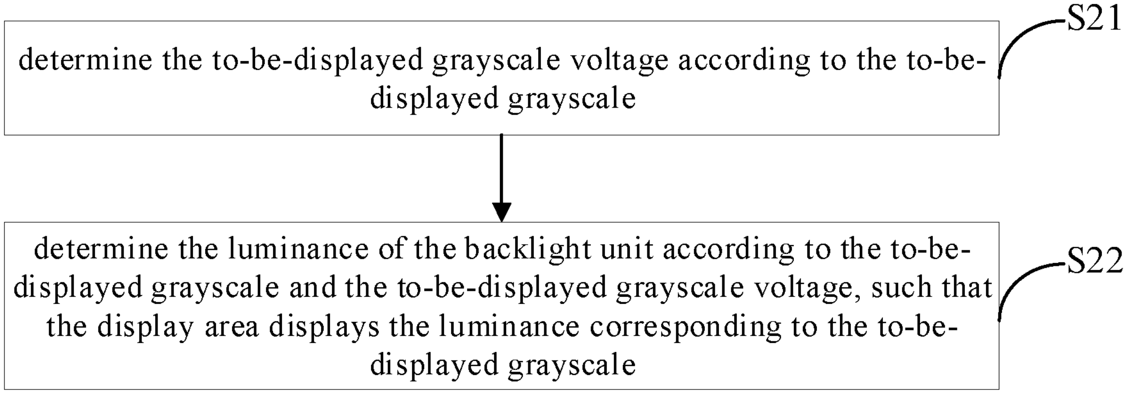
FIG. 4 is a flow chart of part of steps in another driving method according to an embodiment of the present disclosure.

Accordingly, in some embodiments, referring to FIG. 4, Step S2 includes Step S21 of determining the to-be-displayed grayscale voltage according to the to-be-displayed grayscale; and Step S22 of determining the luminance of the backlight unit 201 according to the to-be-displayed grayscale and the to-be-displayed grayscale voltage, such that the display area displays the luminance corresponding to the to-be-displayed grayscale.

According to the relationship between the luminance of the display area and the luminance of the backlight unit 201 and the light transmittance of the display unit 101 shown in formula (1), when the to-be-displayed luminance $I_D$ of the display area is the luminance corresponding to the to-be-displayed grayscale, by adjusting the grayscale voltage of the display unit 101 in step S2, the color gamut of the display area can be changed, and by adjusting the luminance of the backlight unit 201 in step S2, the luminance $I_D$ that the display area displays is the luminance corresponding to the to-be-displayed grayscale, that is, the original luminance of the to-be-displayed image area during display is not changed.

It is not particularly limited how to determine the to-be-displayed grayscale voltage of the display unit according to the to-be-displayed grayscale in the embodiments of the present disclosure. By taking 256 levels of grayscales (the grayscale ranges from 0 to 255) as an example, the grayscale voltage of the display unit 101 may be adjusted when the to-be-displayed grayscale is any one of 0 to 255, such that the color gamut keeps consistent when the to-be-displayed grayscale is any one of 0 to 255; alternatively, the grayscale voltage of the display unit 101 may be adjusted to increase the color gamut only when the color gamut corresponding to the to-be-displayed grayscale is smaller.

In the embodiment of the present disclosure, in the case where the luminance of the backlight unit 201 is constant, the light transmittance of the display unit 101 is changed by adjusting the grayscale voltage of the display unit 101, which realizes the control of the luminance of the display area. In the case where the luminance of the backlight unit 201 is constant, the functional relationship between the luminance and the grayscale voltage of the display area may be represented as a photoelectric conversion curve. In some embodiments, the display device conforms to an industry standard photoelectric conversion curve. For example, the photoelectric conversion curve may be a hybrid log gamma (HLG) curve.

In an embodiment of the present disclosure, a low grayscale threshold is set, and a grayscale lower than the low grayscale threshold is a low grayscale, and a grayscale equal to or higher than the low grayscale threshold is a high grayscale. The low grayscale threshold is not particularly limited in the embodiments of the present disclosure. By taking 256 levels of grayscales as an example, the low grayscale threshold may be any grayscale from 0 to 255, for example, the low grayscale threshold may be 50, 100, or 150.

The color gamut of the display area is narrow in the low brightness range under the condition that the luminance of the backlight unit 201 is constant. In some embodiments, the to-be-displayed grayscale voltage corresponding to the low grayscale is mapped to the grayscale voltage corresponding to the high grayscale in the photoelectric conversion curve, and the luminance of the backlight unit 201 is adjusted accordingly such that the light transmittance of the display unit 101 is improved, and thus the color gamut of the display area in the low brightness range is increased. The to-be-displayed grayscale voltage corresponding to the high grayscale is still the corresponding grayscale voltage in the photoelectric conversion curve. Because the color gamut of the display area is large and stable in the high brightness range, the color gamut of the display area in the whole brightness range can be consistent. In some embodiments, mapping the to-be-displayed grayscale voltage corresponding to the low grayscale to the grayscale voltage corresponding to the high grayscale in the photoelectric conversion curve results in a grayscale mapping relationship between a plurality of low grayscales and at least one high grayscale.

Figure 5:
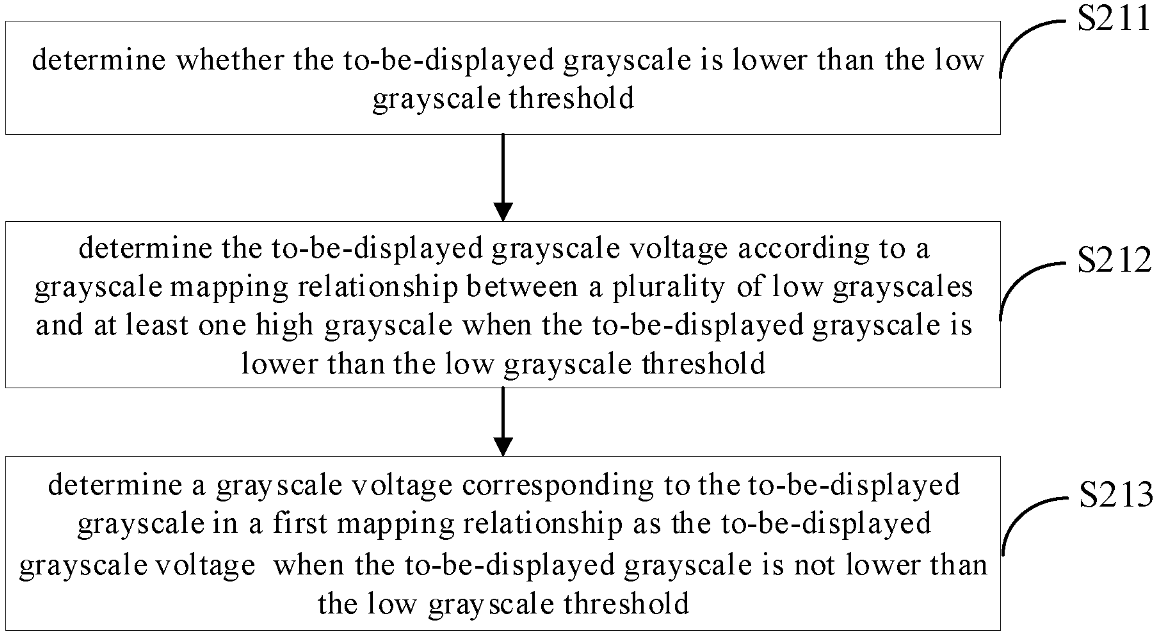
FIG. 5 is a flow chart of part of steps in another driving method according to an embodiment of the present disclosure.

Accordingly, in some embodiments, referring to FIG. 5, Step S21 includes Step S211 of determining whether the to-be-displayed grayscale is lower than the low grayscale threshold; and Step S212 of determining the to-be-displayed grayscale voltage according to a grayscale mapping relationship between a plurality of low grayscales and at least one high grayscale when the to-be-displayed grayscale is lower than the low grayscale threshold. A grayscale lower than the low grayscale threshold is a low grayscale, and a grayscale not lower than the low grayscale threshold is a high grayscale.

Accordingly, in some embodiments, referring to FIG. 5, step S21 further includes: Step S213 of determining a grayscale voltage corresponding to the to-be-displayed grayscale in a first mapping relationship as the to-be-displayed grayscale voltage when the to-be-displayed grayscale is not lower than the low grayscale threshold. The first mapping relationship includes a corresponding relationship between a plurality of grayscales and a plurality of grayscale voltages.

The first mapping relationship is not particularly limited in the embodiments of the present disclosure. In some embodiments, the first mapping relationship is a one-to-one correspondence relationship between grayscales and grayscale voltages in the photoelectric conversion curve.

It is not particularly limited how to map the to-be-displayed grayscale voltage corresponding to the low grayscale to the grayscale voltage corresponding to the high grayscale in the first mapping relationship in the embodiments of the present disclosure.

In some embodiments, the luminance of the backlight unit 201 is adjusted in a case where the to-be-displayed grayscale voltages corresponding to the low grayscales are all mapped to the grayscale voltage corresponding to the same high grayscale in the first mapping relationship. In some embodiments, the luminance of the backlight unit 201 is adjusted such that the luminance displayed in the display area conforms to the photoelectric conversion curve.

Figure 6:
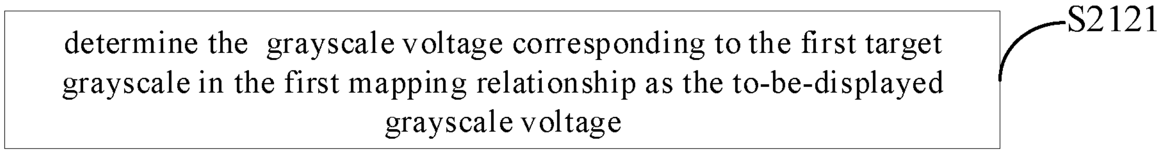
FIG. 6 is flow chart of part of steps in another driving method according to an embodiment of the present disclosure.

Accordingly, in some embodiments, the grayscale mapping relationship includes a plurality of low grayscales each corresponding to a first target grayscale, the first target grayscale being a high grayscale. Referring to FIG. 6, step S212 includes: Step S2121 of determining the grayscale voltage corresponding to the first target grayscale in the first mapping relationship as the to-be-displayed grayscale voltage.

The range of the first target grayscale is not particularly limited in the embodiments of the present disclosure. By taking 256 levels of grayscales as an example, the first target grayscale may be any one of grayscales from 0 to 255, for example, the first target grayscale may be 50, 100, or 150. In some embodiments, the first target grayscale is in a range of 40 to 60, i.e., the first target grayscale may be selected in a range from 40 to 60, for example, the first target grayscale is 50.

It should be noted that, when the grayscale of the liquid crystal display panel is in a range from 40 to 60, the color gamut is large and gradually tends to be stable, and the color coordinates of R, G, B also tend to be stable. The first target grayscale is set to be in the range from 40 to 60, ensuring that the liquid crystal display panel conforms to the photoelectric conversion curve, and meanwhile, the color saturation is remarkably improved and the color gamut is increased in the low brightness range, and the consistency of the color gamut over the whole brightness range is realized.

In some embodiments, the luminance of the backlight unit 201 is adjusted in the case where the to-be-displayed grayscale voltage corresponding to each low grayscale is mapped to the grayscale voltages corresponding to the plurality of high grayscales of a target grayscale section in the first mapping relationship. In some embodiments, the luminance of the backlight unit 201 is adjusted such that the luminance displayed in the display area conforms to the photoelectric conversion curve.

Accordingly, in some embodiments, the grayscale mapping relationship includes one-to-one correspondence between a plurality of low grayscales and a plurality of second target grayscales in the target grayscale section in descending order, and the second target grayscales are high grayscales. Referring to FIG. 7, Step S212 further includes: step S2122 of determining the grayscale voltage corresponding to the second target grayscale corresponding to the to-be-displayed grayscale in the first mapping relationship as the to-be-displayed grayscale voltage.

For example, by taking 256 levels of grayscales as an example, the low grayscale threshold is 50, the low grayscale section is [0,49], the low grayscale section [0,49] is mapped to the target grayscale section [51,100], grayscale 0 corresponds to grayscale 51, grayscale 1 corresponds to grayscale 52, . . . , and so on, and grayscale 49 corresponds to grayscale 100.

It should be noted that, in an embodiment of the present disclosure, not only the to-be-displayed grayscales lower than the low grayscale threshold are all mapped to the target grayscale section, but also the to-be-displayed grayscales in one or more sections lower than the low grayscale threshold may be mapped to the target grayscale section.

It should be noted that mapping the low grayscale section to the high grayscale section is more beneficial to distinguishing different grayscales in the low brightness range, and improving the display effect; meanwhile, the requirement on the backlight source is reduced, so that the cost of the display device can be saved.

It is not particularly limited how to adjust the luminance of the backlight unit 201 in the embodiments of the present disclosure.

In some embodiments, referring to FIG. 8, Step S22 includes: Step S221 of determining a duty ratio of pulse width modulation (PWM) of a to-be-displayed grayscale ("to-be-displayed PWM duty ratio" for short) according to the to-be-displayed grayscale and the to-be-displayed grayscale voltage, so as to adjust the luminance of the backlight unit corresponding to the to-be-displayed image area.

In some embodiments, referring to FIG. 9, Step S221 includes: Step S2211 of performing a fitting process according to the corresponding relationship between the grayscale, the grayscale voltage, and a PWM duty ratio to determine the to-be-displayed PWM duty ratio.

For example, the to-be-displayed grayscale voltages corresponding to the respective low grayscales are all mapped to the grayscale voltage corresponding to the grayscale 50 in the photoelectric conversion curve, and the PWM duty ratios corresponding to the to-be-displayed grayscales 0, 12, 24, 36, and 48 are determined and stored by adjusting the PWM duty ratios in advance. When the to-be-displayed grayscales are grayscales except 0, 12, 24, 36 and 48, the fitting process is performed according to the stored corresponding relationship to determine the to-be-displayed PWM duty ratio.

In a third aspect, an embodiment of the present disclosure provides a driving device, which is applied to a display device. The display device includes a display panel and a backlight source that are sequentially stacked, and the backlight source is disposed on a light incident side of the display panel. The display device is divided into at least one display area, the display panel is divided into at least one display unit, and the backlight source is divided into at least one backlight unit. Each display area at least includes one display unit and one backlight unit. Each backlight unit corresponds to at least one display unit and is configured to provide a light source for the display unit. The driving device may perform any one of the driving methods described in the second aspect of the embodiments of the present disclosure to drive the display device.

In a fourth aspect, an embodiment of the present disclosure provides a display apparatus, including any one of the display devices described in the first aspect of the embodiments of the present disclosure and the driving device described in the third aspect of the embodiments of the present disclosure. The driving device is configured to drive the display device to display. In order to enable those skilled in the art to more clearly understand the technical solutions according to the embodiments of the present disclosure, the technical solutions according to the embodiments of the present disclosure are described in detail below with reference to specific embodiments.

A First Embodiment

In the present embodiment, the display device supports 256 levels of grayscales. The low grayscale threshold is set to be 50, the grayscales lower than 50 are low grayscales, and the grayscales equal to or higher than 50 are high grayscales. The first target grayscale is set to be 50, and the grayscale voltage corresponding to each grayscale in section [0,49] is mapped to the grayscale voltage corresponding to the grayscale 50 in the HLG curve.

For any to-be-displayed image, when the to-be-displayed grayscale of the to-be-displayed image is a low grayscale, the to-be-displayed grayscale voltage is set as the grayscale voltage corresponding to the grayscale 50 in the HLG curve;

The luminance of the backlight source is adjusted such that the display device displays the luminance corresponding to the to-be-displayed grayscale.

Figure 11:
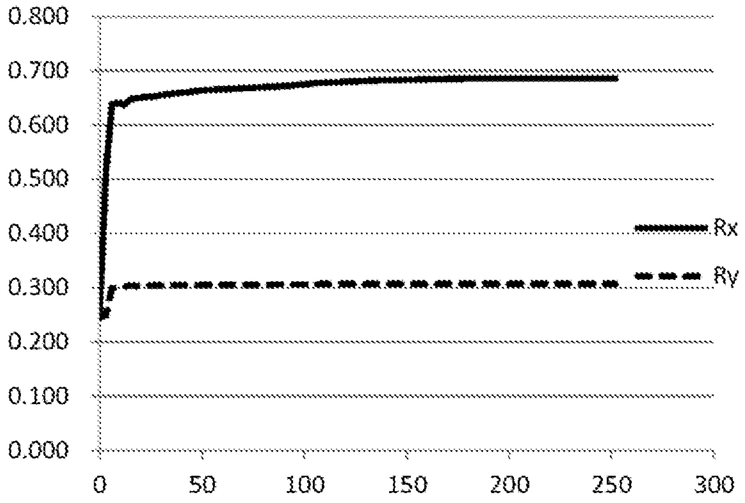
FIG. 11 is a schematic diagram illustrating color coordinates of red light varying with grayscales according to an embodiment of the present disclosure.
Figure 12:
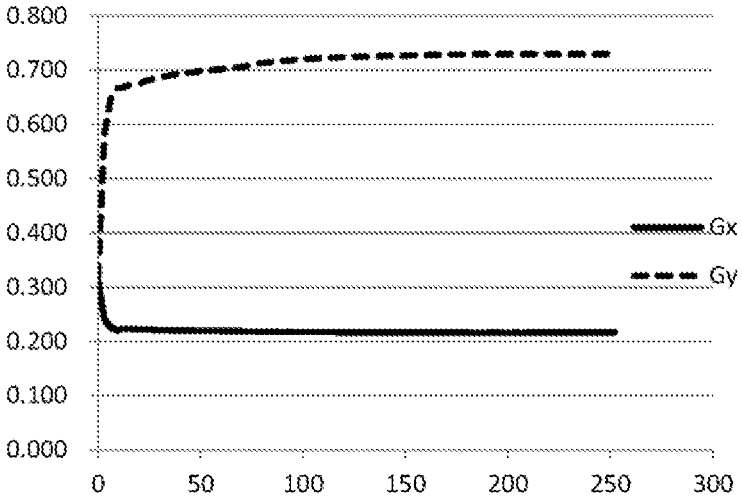
FIG. 12 is a schematic diagram illustrating color coordinates of green light varying with grayscales according to an embodiment of the present disclosure.
Figure 13:
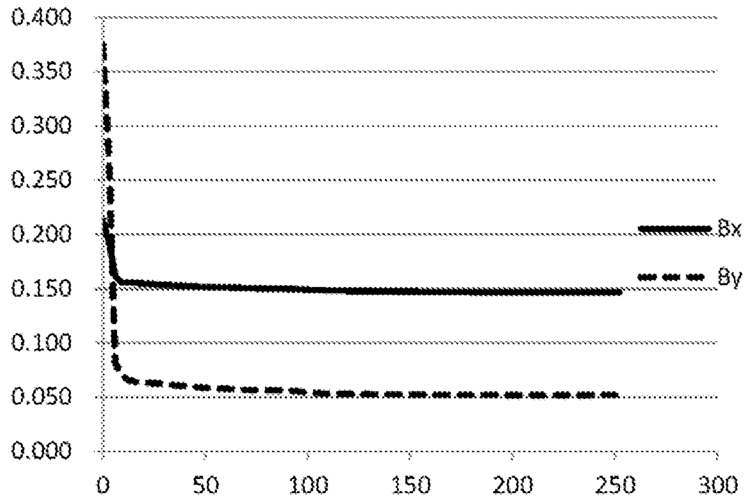
FIG. 13 is a schematic diagram illustrating color coordinates of blue light varying with grayscales according to an embodiment of the present disclosure.
Figure 14:
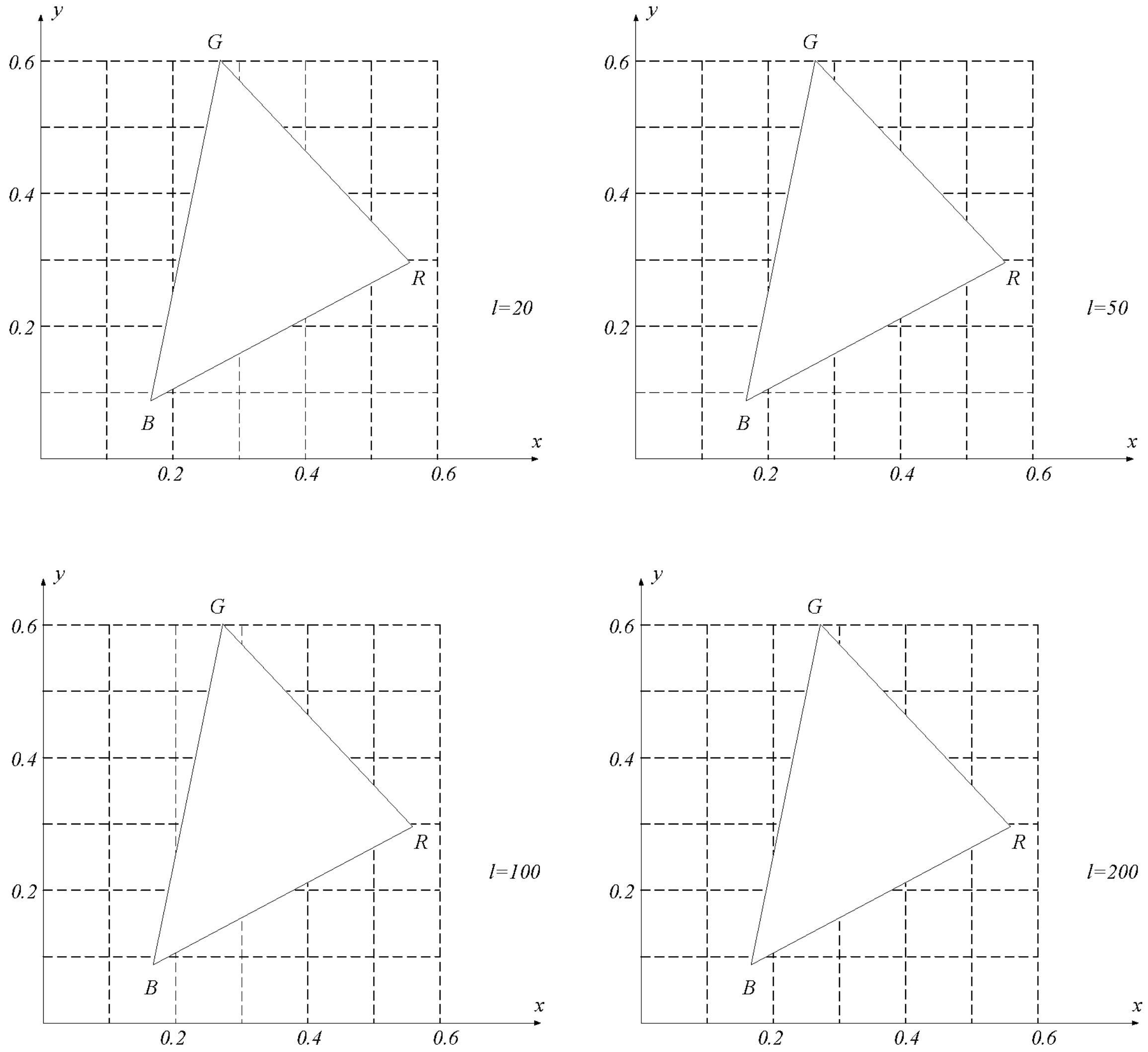
FIG. 14 is a schematic diagram of color gamut values corresponding to different grayscales according to an embodiment of the present disclosure.

FIG. 10 is a schematic diagram illustrating color coordinates Wx and Wy of white light varying with the grayscales according to the present embodiment. FIG. 11 is a schematic diagram illustrating the color coordinates Rx and Ry of red light varying with the grayscales according to the present embodiment. FIG. 12 is a schematic diagram illustrating the color coordinates Gx and Gy of green light varying with the grayscales according to the present embodiment. FIG. 13 is a schematic diagram illustrating the color coordinates Bx and By of blue light varying with the grayscales according to the present embodiment. In FIGS. 10 to 13, the abscissa represents the grayscale and the ordinate represents the color coordinate. As shown in FIGS. 10 to 13, in the low grayscale range of the display device, the color coordinates Wx and Wy of white light, the color coordinates Rx and Ry of red light, the color coordinates Gx and Gy of green light, and the color coordinates Bx and By of blue light can be changed to and maintained at stable values rapidly as the grayscale increases, that is, the color gamut can be constant over the whole brightness range. In FIG. 14, the horizontal axis x and the vertical axis y represent color coordinates, l represents a grayscale, three vertexes of a triangle represent color coordinates of red light, green light, and blue light, respectively, and the area of the triangle represents a color gamut. As shown in FIG. 14, when the grayscales l are 20, 50, 100, and 200, the corresponding color gamut values (that is, area, hereinafter "color gamut area") are all substantially the same, that is, the color gamut of the display device is maximized and consistent over the whole brightness range.

By taking the grayscale 37 and the grayscale 50 as examples, the color coordinates and luminance for R, G, B and W corresponding to the grayscale 37 and the grayscale 50 in the HLG curve are shown in table 1, when the display device in related art is tested separately.

TABLE 1

| | Grayscale 50 of display device | | | Grayscale 37 of display device | | |
|---|---|---|---|---|---|---|
| | x | y | Luminance | x | y | Luminance |
| W | 0.3166 | 0.3451 | 4.6556 | 0.3175 | 0.3293 | 1.1698 |
| R | 0.5733 | 0.2998 | 1.3251 | 0.4561 | 0.2924 | 0.4336 |
| G | 0.2330 | 0.5973 | 2.8734 | 0.2461 | 0.4904 | 0.8255 |
| B | 0.1734 | 0.0932 | 0.5300 | 0.2103 | 0.1609 | 0.2533 |

where the luminance of white light corresponding to grayscale 50 is 4.6556 nit, and the color gamut area is 45.84% BT2020; the luminance of white light corresponding to grayscale 37 is 1.1689 nit and the color gamut area is 17.39% BT2020.

In the display device according to an embodiment of the disclosure, the grayscale voltage corresponding to grayscale 37 is set as the grayscale voltage corresponding to grayscale 50, and the luminance of the backlight source is adjusted at the same time, such that the luminance of the display device is readjusted to the luminance corresponding to grayscale 37. The obtained color coordinates and luminance of grayscale 37 are shown in table 2.

TABLE 2

| | Grayscale 37 of display device | | |
|---|---|---|---|
| | x | y | Luminance |
| W | 0.3190 | 0.3463 | 1.1711 |
| R | 0.5755 | 0.3008 | 0.3425 |
| G | 0.2327 | 0.5987 | 0.7284 |
| B | 0.1746 | 0.0948 | 0.1355 |

It can be seen that the luminance of white light corresponding to grayscale 37 in table 2 is consistent with the luminance of white light corresponding to grayscale 37 in table 1, and the color coordinates of red light, white light, and blue light corresponding to the grayscale 37 in table 2 are consistent with the color coordinates of red light, white light, and blue light corresponding to grayscale 50 in table 1. The color gamut area corresponding to grayscale 37 is increased to 45.67% BT2020, which is consistent with the color gamut area corresponding to grayscale 50.

It will be understood by those of ordinary skill in the art that all or some of the steps of the methods, systems, functional modules/units in the devices disclosed above may be implemented as software, firmware, hardware, or suitable combinations thereof. In a hardware implementation, the division between functional modules/units mentioned in the above description does not necessarily correspond to the division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on computer readable medium, which may include computer storage medium (or non-transitory medium) and communication medium (or transitory medium). The term "computer storage medium" includes volatile and nonvolatile, removable and non-removable medium implemented in any method or technology for storage of information such as computer readable instructions, data structures, program modules or other data, as is well known to those skilled in the art. Computer storage medium includes, but is not limited to, RAM, ROM, EEPROM, flash memory or other memory technology, CD- ROM, digital versatile disk (DVD) or other optical disk storage, magnetic cassette, magnetic tape, magnetic disk storage or other magnetic storage device, or any other medium which may be used to store the desired information and which may be accessed by a computer. In addition, communication medium typically includes computer readable instructions, data structures, program modules or other data in a modulated data signal such as a carrier wave or other transport mechanism, and may include any information delivery medium, as is well known to those skilled in the art.

Example embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A display device, comprising a display panel and a backlight source sequentially stacked, wherein the backlight source is on a light incidence side of the display panel;

the display device is divided into at least one display area, the display panel is divided into at least one display unit, the backlight source is divided into at least one backlight unit;

the display area at least comprises one of the at least one display unit and one of the at least one backlight unit;

each backlight unit at least corresponds to one display unit; the backlight unit is configured to provide a light source for the display unit; and in the display area, a grayscale voltage of the display unit and a luminance of the backlight unit are adjustable, wherein the display device further comprises a processor configured to adjust the grayscale voltage of the display unit and the luminance of the backlight unit by determining a to-be-displayed grayscale voltage of the display unit and the luminance of the backlight unit according to a to-be-displayed grayscale, wherein the processor is further configured to:

determine whether the to-be-displayed grayscale is lower than a low grayscale threshold; and determine the to-be-displayed grayscale voltage according to a grayscale mapping relationship and a first mapping relationship in response to the to-be-displayed grayscale being lower than the low grayscale threshold, wherein in the grayscale mapping relationship, a plurality of low grayscales lower than the low grayscale threshold are mapped to at least one high grayscale not lower than the low grayscale threshold, and in the first mapping relationship, grayscales are mapped to grayscale voltages in one-to-one correspondence based on a photoelectric conversion curve;

adjust the grayscale voltage of the display unit by using the determined to-be-displayed grayscale voltage to increase color gamut of at least one display area, and adjust the luminance of the backlight unit according to the to-be-displayed grayscale and the adjusted grayscale voltage such that the display area displays a luminance corresponding to the to-be-displayed grayscale.

2. The display device of claim 1, wherein each display area is provided with only one pixel, and each backlight unit corresponds to only one pixel.

3. A driving method of a display device, wherein the display device comprises a display panel and a backlight source sequentially stacked, the backlight source is on a light incidence side of the display panel; the display device is divided into at least one display area, the display panel is divided into at least one display unit, the backlight source is divided into at least one backlight unit; the display area at least comprises one of the at least one display unit and one of the at least one backlight unit; each backlight unit at least corresponds to one display unit and configured to provide a light source for the display unit; and in the display area, the driving method comprises:

determining a to-be-displayed grayscale of a to-be-displayed image area corresponding to the display area, wherein a to-be-displayed image is divided into at least one to-be-displayed image area, and each to-be-displayed image area corresponds to one display area; and adjusting grayscale voltage of the display unit and a luminance of the backlight unit by determining a to-be-displayed grayscale voltage of the display unit and the luminance of the backlight unit according to a to-be-displayed grayscale, wherein adjusting the grayscale voltage of the display unit and the luminance of the backlight unit comprises:

determining whether the to-be-displayed grayscale is lower than a low grayscale threshold; and determining the to-be-displayed grayscale voltage according to a grayscale mapping relationship and a first mapping relationship in response to the to-be-displayed grayscale being lower than the low grayscale threshold, wherein in the grayscale mapping relationship, a plurality of low grayscales lower than the low grayscale threshold are mapped to at least one high grayscale not lower than the low grayscale threshold, and in the first mapping relationship, grayscales are mapped to grayscale voltages in one-to-one correspondence based on a photoelectric conversion curve;

adjusting the grayscale voltage of the display unit by using the determined to-be-displayed grayscale voltage to increase color gamut of at least one display area, and adjusting the luminance of the backlight unit according to the to-be-displayed grayscale and the adjusted grayscale voltage such that the display area displays a luminance corresponding to the to-be-displayed grayscale.

4. The driving method according to claim 3, wherein in the grayscale mapping relationship, the plurality of low grayscales are mapped to a first target grayscale, the first target grayscale being the high grayscale; and the method further comprises determining a grayscale voltage corresponding to the first target grayscale in a first mapping relationship as the to-be-displayed grayscale voltage.

5. The driving method according to claim 3, wherein in the grayscale mapping relationship, the plurality of low grayscales are mapped to a plurality of second target grayscales in one-to-one correspondence, and the plurality of second target grayscales are high grayscales, and the larger the value of the low grayscale, the larger the value of a corresponding second target grayscale; and the method comprises:

determining a grayscale voltage corresponding to the second target grayscale corresponding to the to-be-displayed grayscale in the first mapping relationship as the to-be-displayed grayscale voltage.

6. The driving method according to claim 3, the method further comprises:

determining a grayscale voltage corresponding to the to-be-displayed grayscale in a first mapping relationship as the to-be-displayed grayscale voltage, in response to the to-be-displayed grayscale being not lower than the low grayscale threshold.

7. The driving method according to claim 3, wherein adjusting the luminance of the backlight unit according to the to-be-displayed grayscale and the to-be-displayed grayscale voltage comprises:

determining a duty ratio of pulse width modulation (PWM) of a to-be-displayed grayscale according to the to-be-displayed grayscale and the to-be-displayed grayscale voltage to determine the luminance of the backlight unit.

8. The driving method according to claim 7, wherein determining the duty ratio of pulse width modulation of the to-be-displayed grayscale according to the to-be-displayed grayscale and the to-be-displayed grayscale voltage comprises:

performing fitting according to a corresponding relationship between the grayscale, the grayscale voltage and a duty ratio of pulse width modulation to determine the duty ratio of pulse width modulation of the to-be-displayed grayscale.

9. A driving device applied to a display device, wherein the display device comprises a display panel and a backlight source sequentially stacked, the backlight source is on a light incidence side of the display panel; the display device is divided into at least one display area, the display panel is divided into at least one display unit, the backlight source is divided into at least one backlight unit; the display area at least comprises one of the at least one display unit and one of the at least one backlight unit; each backlight unit at least corresponds to one display unit; the backlight unit is configured to provide a light source for the display unit; and the driving device is configured to perform the driving method of claim 3 to drive the display device.

10. A display apparatus, comprising a display device and a driving device, wherein the display device comprise a display panel and a backlight source sequentially stacked, wherein the backlight source is on a light incidence side of the display panel;

the display device is divided into at least one display area, the display panel is divided into at least one display unit, the backlight source is divided into at least one backlight unit;

the display area at least comprises one of the at least one display unit and one of the at least one backlight unit;

each backlight unit at least corresponds to one display unit; the backlight unit is configured to provide a light source for the display unit; and in the display area, a grayscale voltage of the display unit and a luminance of the backlight unit are adjustable, wherein the driving device is configured to perform a driving method comprising:

determining a to-be-displayed grayscale of a to-be-displayed image area corresponding to the display area, wherein a to-be-displayed image is divided into at least one to-be-displayed image area, and each to-be-displayed image area corresponds to one display area; and determining a to-be-displayed grayscale voltage of the display unit and a luminance of the backlight unit according to the to-be-displayed grayscale, wherein determining the to-be-displayed grayscale voltage of the display unit and the luminance of the backlight unit according to the to-be-displayed grayscale comprises:

determining whether a to-be-displayed grayscale is lower than a low grayscale threshold;

determining a to-be-displayed grayscale voltage according to a grayscale mapping relationship and a first mapping relationship in response to the to-be-displayed grayscale being lower than the low grayscale threshold, wherein in the grayscale mapping relationship, a plurality of low grayscales lower than the low grayscale threshold are mapped to at least one high grayscale not lower than the low grayscale threshold, and in the first mapping relationship, grayscales are mapped to grayscale voltages in one-to-one correspondence based on a photoelectric conversion curve;

adjusting the grayscale voltage of the display unit by using the determined to-be-displayed grayscale voltage to increase color gamut of at least one display area, and adjusting the luminance of the backlight unit according to the to-be-displayed grayscale and the adjusted grayscale voltage such that the display area displays a luminance corresponding to the to-be-displayed grayscale.

* * * * *